US010394491B2

(12) United States Patent
Diel et al.

(10) Patent No.: US 10,394,491 B2
(45) Date of Patent: Aug. 27, 2019

(54) EFFICIENT ASYNCHRONOUS MIRROR COPY OF THIN-PROVISIONED VOLUMES

(71) Applicant: International Business Machines Corporation, Armonk, NY (US)

(72) Inventors: Eduard A. Diel, Tucson, AZ (US); Lisa J. Gundy, Tucson, AZ (US); David M. Shackelford, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/098,352

(22) Filed: Apr. 14, 2016

(65) Prior Publication Data

US 2017/0300243 A1 Oct. 19, 2017

(51) Int. Cl.
*G06F 3/06* (2006.01)
*G06F 11/14* (2006.01)

(52) U.S. Cl.
CPC .............. *G06F 3/067* (2013.01); *G06F 3/065* (2013.01); *G06F 3/0608* (2013.01); *G06F 3/0665* (2013.01); *G06F 11/14* (2013.01)

(58) Field of Classification Search
USPC ........................................................ 711/162
See application file for complete search history.

(56) References Cited

U.S. PATENT DOCUMENTS

| | | | | |
|---|---|---|---|---|
| 6,269,431 B1 * | 7/2001 | Dunham | ............. | G06F 11/1469 707/999.202 |
| 6,351,792 B1 * | 2/2002 | Milillo | ................ | G06F 11/1456 711/162 |
| 6,353,878 B1 * | 3/2002 | Dunham | ............. | G06F 11/1456 707/999.009 |
| 6,366,987 B1 * | 4/2002 | Tzelnic | ............... | G06F 11/1451 711/112 |
| 6,385,706 B1 * | 5/2002 | Ofek | ................... | G06F 11/1464 707/999.202 |

(Continued)

OTHER PUBLICATIONS

Qian et al., "ThinStore: Out-of-Band Virtualization with Thin Provisioning," 2011 Sixth IEEE International Conference on Networking, Architecture, and Storage, Jul. 2011.

*Primary Examiner* — Mano Padmanabhan
*Assistant Examiner* — Jean C Edouard
(74) *Attorney, Agent, or Firm* — Nelson and Nelson; Daniel P. Nelson; Alexis V. Nelson (57) ABSTRACT

A method for copying data from a primary thin-provisioned volume to a secondary thin-provisioned volume includes issuing a query to a primary storage system. The primary storage system hosts a thin-provisioned volume made up of multiple storage elements. The method returns, in response to the query, a reply indicating which storage elements in the thin-provisioned volume are backed by physical storage. In certain embodiments, the reply contains a bitmap having a bit for each storage element in the thin-provisioned volume. In other embodiments, the reply contains a starting address and ending address for each storage area that is backed, or not backed, by physical storage. The method then copies, from the primary storage system to a secondary storage system, data in only those storage elements that are backed by physical storage. A corresponding system and computer program product are also disclosed.

20 Claims, 6 Drawing Sheets

(56) References Cited

U.S. PATENT DOCUMENTS

| | | | |
|---|---|---|---|
| 6,434,681 B1* | 8/2002 | Armangau | G06F 11/1466 711/162 |
| 6,446,175 B1* | 9/2002 | West | G06F 11/1456 711/161 |
| 6,457,109 B1* | 9/2002 | Milillo | G06F 3/0605 711/161 |
| 6,549,992 B1* | 4/2003 | Armangau | G06F 11/1456 707/999.202 |
| 8,453,011 B2 | 5/2013 | Kawaguchi et al. | |
| 8,527,723 B1* | 9/2013 | Kasako | G06F 3/0607 711/161 |
| 8,762,663 B2* | 6/2014 | Broido | G06F 11/2069 711/161 |
| 8,769,186 B2 | 7/2014 | Garman et al. | |
| 8,775,751 B1 | 7/2014 | Pendharkar et al. | |
| 8,782,358 B2* | 7/2014 | Broido | G06F 11/2069 711/161 |
| 8,806,157 B2 | 8/2014 | Broido et al. | |
| 8,892,847 B2* | 11/2014 | Imazaki | G06F 3/0608 711/114 |
| 8,935,499 B2 | 1/2015 | Chhaunker et al. | |
| 2005/0071549 A1* | 3/2005 | Tross | G06F 11/2076 711/113 |
| 2006/0224844 A1 | 10/2006 | Kano et al. | |
| 2007/0277015 A1* | 11/2007 | Kalos | G06F 3/0605 711/170 |
| 2008/0034176 A1* | 2/2008 | Akutsu | G06F 11/2058 711/162 |
| 2009/0055593 A1* | 2/2009 | Satoyama | G06F 3/0608 711/134 |
| 2009/0240880 A1* | 9/2009 | Kawaguchi | G06F 3/0617 711/114 |
| 2012/0151139 A1* | 6/2012 | Shiga | G06F 3/0605 711/114 |
| 2012/0210064 A1* | 8/2012 | Coronado | G06F 11/2069 711/118 |
| 2012/0254114 A1* | 10/2012 | Gundy | G06F 17/30088 707/639 |
| 2012/0278568 A1* | 11/2012 | Broido | G06F 11/2069 711/162 |
| 2012/0278572 A1* | 11/2012 | Broido | G06F 3/0607 711/162 |
| 2012/0331224 A1* | 12/2012 | Jones | G06F 3/0605 711/114 |
| 2012/0331225 A1* | 12/2012 | Jones | G06F 3/0605 711/114 |
| 2013/0036280 A1* | 2/2013 | Futawatari | G06F 3/061 711/162 |
| 2013/0282887 A1* | 10/2013 | Terayama | G06F 9/45533 709/223 |
| 2013/0282966 A1* | 10/2013 | Venkiteswaran | G06F 8/665 711/103 |
| 2013/0346712 A1* | 12/2013 | Agombar | G06F 11/1458 711/162 |
| 2013/0346713 A1 | 12/2013 | Beeken et al. | |
| 2014/0195745 A1* | 7/2014 | Shiratori | G06F 12/00 711/154 |
| 2014/0304224 A1 | 10/2014 | Lopez et al. | |
| 2014/0359238 A1* | 12/2014 | Imazaki | C09K 5/16 711/162 |
| 2017/0300243 A1 | 10/2017 | Diel et al. | |

* cited by examiner

EFFICIENT ASYNCHRONOUS MIRROR COPY OF THIN-PROVISIONED VOLUMES

BACKGROUND

Field of the Invention

This invention relates to systems and methods for replicating data in thin-provisioned volumes.

Background of the Invention

In data replication environments such as Peer-to-Peer-Remote-Copy ("PPRC") or Extended-Remote-Copy ("XRC") environments, data is mirrored from a primary volume, residing on primary storage system, to a secondary volume residing on a secondary storage system, in order to maintain two consistent copies of the data. The primary and secondary storage systems may be located at different sites, perhaps hundreds or even thousands of miles away from one another. In the event the primary storage system fails, I/O may be redirected to the secondary storage system, thereby enabling continuous operations. When the primary storage system is repaired, I/O may resume to the primary storage system.

When setting up an asynchronous data replication system such as XRC, data residing on a primary volume may be initially copied to a secondary volume. Updates to the primary volume may then be asynchronously mirrored to the secondary volume to maintain two consistent copies of the data. Although this process works well for conventional fully provisioned volumes, problems may arise when using thin-provisioned volumes on the primary and/or secondary storage systems.

As known to those of skill in the art, a thin-provisioned volume is a volume characterized by virtual capacity and real capacity. Virtual capacity is the storage capacity that is available to hosts accessing the thin-provisioned volume. Real capacity is the storage capacity of the thin-provisioned volume that is actually backed by physical storage. As data is written to a thin-provisioned volume, physical storage space may be allocated to the thin-provisioned volume from a free storage pool on an as-need basis, thereby increasing its real capacity. Similarly, as data is deleted or erased from the thin-provisioned volume, physical storage space may be released back to the free storage pool, thereby making it available to other thin-provisioned volumes, or the same thin-provisioned volume if needed again. In this way, a thin-provisioned volume may efficiently utilize physical storage space and prevent the "overprovisioning" of physical storage space.

Unfortunately, asynchronous data replication technologies may run into problems when establishing mirroring relationships between thin-provisioned volumes. As previously stated, when setting up an asynchronous data replication environment, data residing on a primary volume may be initially copied to a secondary volume. Because a thin-provisioned volume may appear to a host to have a certain virtual capacity, the entire virtual capacity of the primary thin-provisioned volume may be copied to a secondary thin-provisioned volume when establishing an asynchronous data mirroring relationship. This will cause substantially more physical storage space than is necessary (i.e., equal to the virtual capacity of the primary thin-provisioned volume) to be allocated to the secondary thin-provisioned volume. This undermines the purpose of thin-provisioning by inefficiently utilizing storage space.

In view of the foregoing, what are needed are systems and methods to more effectively utilize thin-provisioned volumes in data replication systems, particularly asynchronous data replication systems.

SUMMARY

The invention has been developed in response to the present state of the art and, in particular, in response to the problems and needs in the art that have not yet been fully solved by currently available systems and methods. Accordingly, the invention has been developed to provide systems and methods to copy data from a primary thin-provisioned volume to a secondary thin-provisioned volume. The features and advantages of the invention will become more fully apparent from the following description and appended claims, or may be learned by practice of the invention as set forth hereinafter.

Consistent with the foregoing, a method for copying data from a primary thin-provisioned volume to a secondary thin-provisioned volume is disclosed. In one embodiment, such a method includes issuing a query to a primary storage system. The primary storage system hosts a thin-provisioned volume made up of multiple storage elements. The method returns, in response to the query, a reply indicating which storage elements in the thin-provisioned volume are backed by physical storage. In certain embodiments, the reply contains a bitmap having a bit for each storage element in the thin-provisioned volume, where each bit in the bitmap is set depending on whether the associated storage element is backed by physical storage. In other embodiments, the reply contains a list of tuples, where each tuple includes a starting address and ending address for a storage area that is backed by physical storage. The method then copies, from the primary storage system to a secondary storage system, data in only those storage elements that are backed by physical storage.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Figure 1:
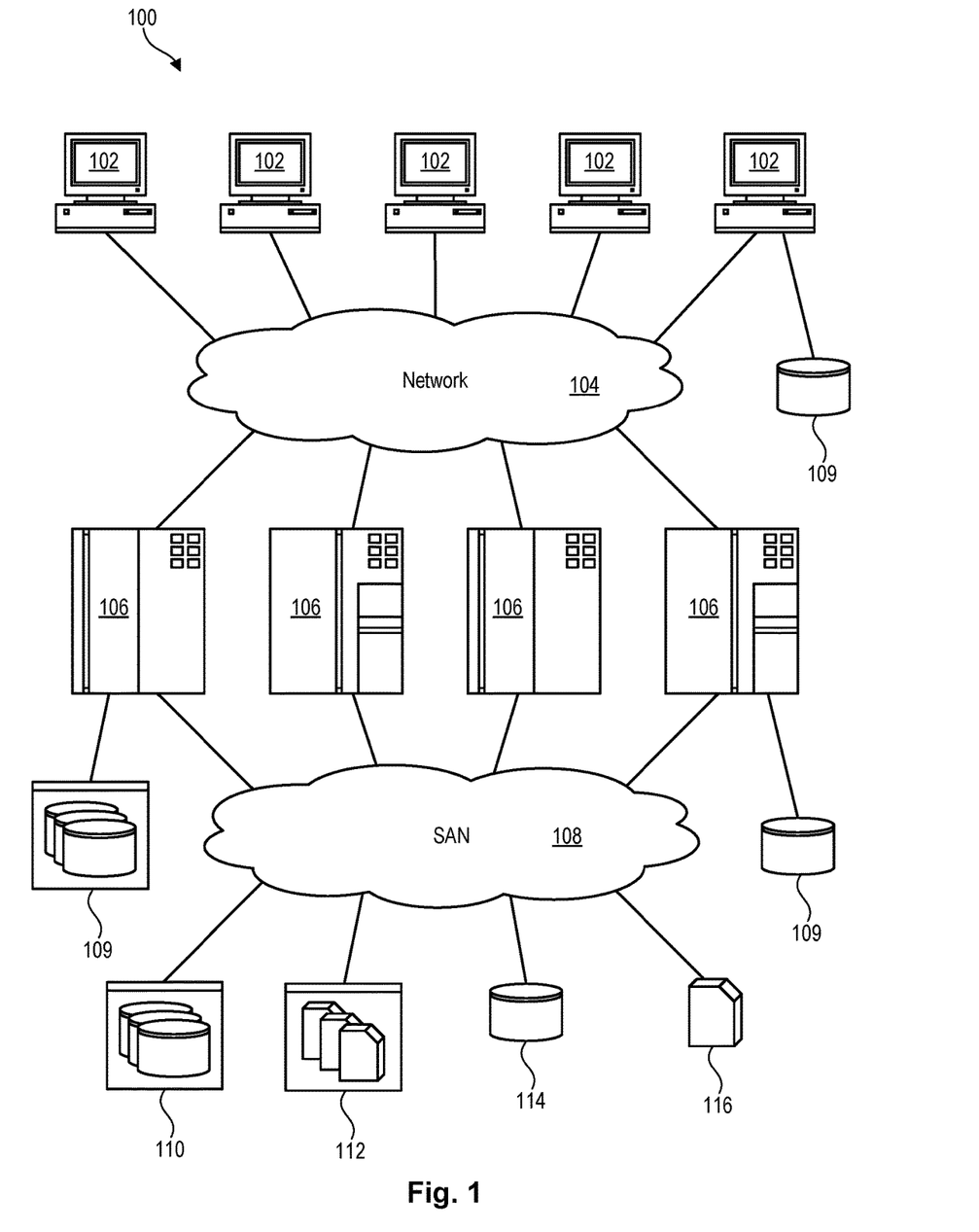
FIG. 1 is a high-level block diagram showing one example of a network environment in which systems and methods in accordance with the invention may operate.

Referring to FIG. 1, one example of a network environment 100 is illustrated. The network environment 100 is presented to show one example of an environment where systems and methods in accordance with the invention may be implemented. The network environment 100 is presented only by way of example and not limitation. Indeed, the systems and methods disclosed herein may be applicable to a wide variety of network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 109 (e.g., arrays of hard-disk drives, solid-state drives, tape drives, etc.). These computers 102, 106 and direct-attached storage systems 109 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110 of hard-disk drives or solid-state drives, tape libraries 112, individual hard-disk drives 114 or solid-state drives 114, tape drives 116, CD-ROM libraries, or the like. To access a storage system 110, 112, 114, 116, a host system 106 may communicate over physical connections from one or more ports on the host 106 to one or more ports on the storage system 110, 112, 114, 116. A connection may be through a switch, fabric, direct connection, or the like. In certain embodiments, the servers 106 and storage systems 110, 112, 114, 116 may communicate using a networking standard such as Fibre Channel (FC).

Figure 2:
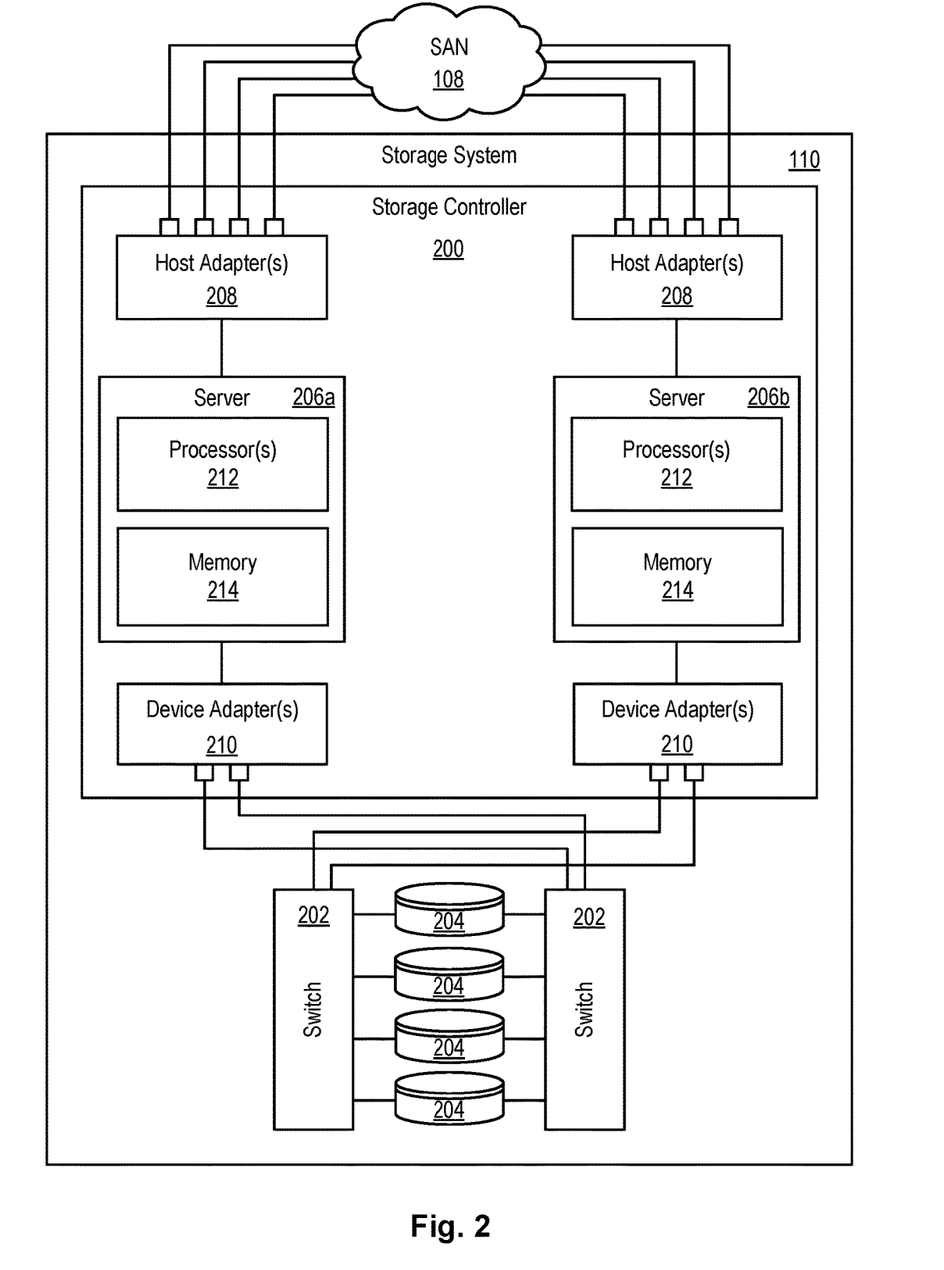
FIG. 2 is a high-level block diagram showing one example of a storage system that may host one or more thin-provisioned volumes.

Referring to FIG. 2, one embodiment of a storage system 110 containing an array of hard-disk drives 204 and/or solid-state drives 204 is illustrated. As shown, the storage system 110 includes a storage controller 200, one or more switches 202, and one or more storage drives 204, such as hard disk drives 204 or solid-state drives 204 (such as flash-memory-based drives 204). The storage controller 200 may enable one or more hosts 106 (e.g., open system and/or mainframe servers 106 running operating systems such z/OS, zVM, or the like) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. The servers 206 may host at least one instance of these software modules. These software modules may manage all read and write requests to logical volumes in the storage drives 204.

One example of a storage system 110 having an architecture similar to that illustrated in FIG. 2 is the IBM DS8000™ enterprise storage system. The DS8000™ is a high-performance, high-capacity storage controller providing disk storage that is designed to support continuous operations. Nevertheless, the apparatus and methods disclosed herein are not limited to operation with the IBM DS8000™ enterprise storage system 110, but may operate with any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented only by way of example and is not intended to be limiting.

Figure 3:
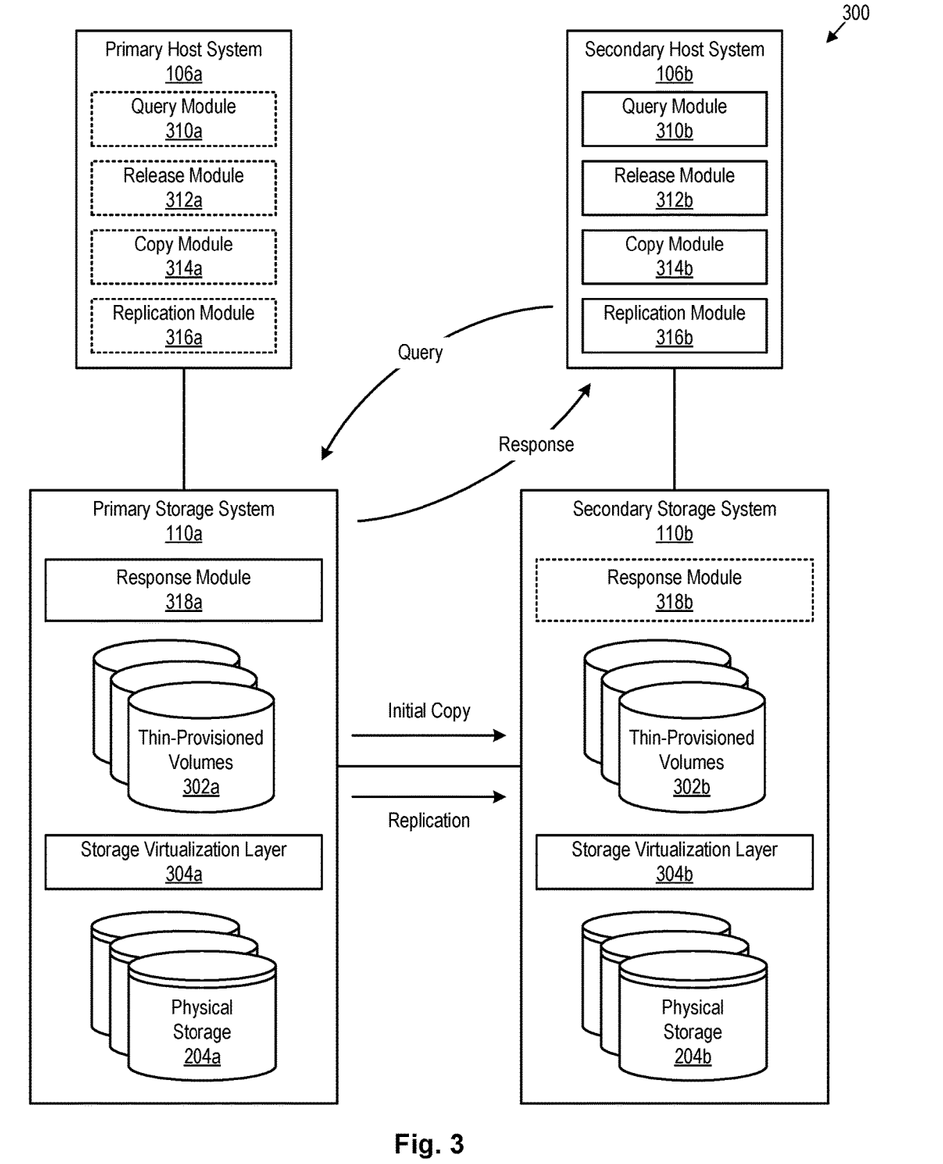
FIG. 3 is a high-level block diagram showing a data replication system configured to use a system and method in accordance with the invention.

Referring to FIG. 3, in certain embodiments, a storage system 110 such as that described in FIG. 2 may be included in a data replication system 300, where data is mirrored from a primary storage system 110a to a secondary storage system 110b. Such a system 300 may maintain two consistent copies of the data. The primary and secondary storage systems 110a, 110b may be located at different sites, perhaps hundreds or even thousands of miles away from one another. In the event the primary storage system 110a fails, I/O may be redirected to the secondary storage system 110b after disaster recovery operations are complete at the secondary site.

As shown in FIG. 3, the data replication system 300 may include a host system 106a at the primary site (hereinafter a "primary host system 106a") and a host system 106b at the secondary site (hereinafter a "secondary host system 106b"). If the primary host system 106a and/or primary storage system 110a fails, the secondary host system 106b may step in to perform operations of the primary host system 106a. Under normal operating conditions, the secondary host system 106b may also assist in replicating data from the primary storage system 110a to the secondary storage system 110b. For example, in an asynchronous data replication system such as XRC (also known as z/OS Global Mirror), when writes occur to the primary storage system 110a, the secondary host system 106b asynchronously reads the newly written data from the primary storage system 110a and writes it to the secondary storage system 110b, thereby maintaining two consistent copies of the data.

As previously mentioned, when setting up asynchronous data replication systems such as XRC, data residing on a primary volume 302a may be initially copied to a secondary volume 302b. Updates to the primary volume 302a may then be asynchronously mirrored to the secondary volume 302b to maintain two consistent copies of the data. Although this process works well for conventional fully provisioned volumes, problems may arise when using thin-provisioned volumes 302a, 302b, such as those shown in FIG. 3.

As previously explained, a thin-provisioned volume 302 may be characterized by virtual capacity and real capacity. Virtual capacity is storage capacity that is available to hosts 106 accessing the thin-provisioned volume 302. Real capacity is storage capacity of the thin-provisioned volume 302 that is actually backed by physical storage 204. A storage virtualization layer 304 may map real capacity to physical storage 204. As data is written to a thin-provisioned volume 302, the storage virtualization layer 304 will allocate physical storage space 204 to the thin-provisioned volume 302 from a free storage pool, thereby increasing its real capacity. Similarly, as data is deleted or erased from the thin-provisioned volume 302, software can notify the storage virtualization layer 304 that it can reclaim physical storage space 204 from the thin-provisioned volume 302 and return it to the free storage pool, thereby making it available to other thin-provisioned volumes 302 or the same thin-provisioned volume 302 if needed again. In this way, a thin-provisioned volume 302 may efficiently utilize physical storage space and prevent fully provisioning physical storage space.

Because a thin-provisioned volume 302a residing on a primary storage system 110a may appear to a secondary host system 106b to have a certain virtual capacity, the secondary host system 106b may copy the entire virtual capacity of the primary thin-provisioned volume 302a to the secondary thin-provisioned volume 302b when establishing an asynchronous data mirroring relationship, regardless of how much virtual capacity is backed by physical storage 204. This will allocate substantially more physical storage space to the secondary thin-provisioned volume 302b than is necessary. This undermines the purpose of thin-provisioning by causing the secondary thin-provisioned volume 302b to inefficiently utilize storage space.

In order to address this problem, functionality may be provided in the data replication system 300 to enable a host system 106 to determine which storage elements (e.g., tracks, groups of tracks, cylinders, groups of cylinders, extents, groups of extents, etc.) of a thin-provisioned volume 302 are backed by physical storage 204. This will enable a host system 106 to copy only those storage elements that are backed by physical storage 204. This functionality may be implemented in the form of one or more modules in the data replication system 300. For example, the secondary host system 106b may include one or more of a query module 310b, release module 312b, copy module 314b, and replication module 316b. Similarly, the primary storage system 110a may include a response module 318a. The modules may be implemented in hardware, software, firmware, or a combination thereof. Corresponding modules are shown in the primary host system 106a and secondary storage system 110b since these systems 106a, 110b may be configured to perform the same functions in the event of a HyperSwap® or failover event, or if the roles of the primary host system 106a/primary storage system 110a and secondary host system 106b/secondary storage system 110b are swapped.

Prior to setting up an asynchronous mirroring relationship between a primary thin-provisioned volume 302a and a secondary thin-provisioned volume 302b, the query module 310b may query the primary storage system 110a to determine which storage elements in the primary thin-provisioned volume 302a are backed by physical storage 204a. The response module 318a in the primary storage system 110a may respond to this query with a response message 400 that indicates which storage elements in the primary thin-provisioned volume 302a are backed by physical storage 204. The form of this message 400 may vary in different embodiments. Several examples of such a message 400 will be discussed in association with FIGS. 4A and 4B.

Once the secondary host system 106b receives the response message 400, a release module 312b may optionally release, from the secondary thin-provisioned volume 302b, any storage elements that have been allocated to the secondary thin-provisioned volume 302b (i.e., backed by physical storage 204) but are not being used. The release module 312b may release these storage elements back to a free storage pool of the secondary storage system 110b.

To establish an asynchronous mirroring relationship between the primary thin-provisioned volume 302a and secondary thin-provisioned volume 302b, the copy module 314b may initially copy data from the primary thin-provisioned volume 302a to the secondary thin-provisioned volume 302b. Using the information in the response message 400, the copy module 314b may copy only those storage elements on the primary thin-provisioned volume 302a that are backed by physical storage 204a. This will reduce the number of I/Os to the primary storage system 110a and secondary storage system 110b, as well as ensure that the secondary thin-provisioned volume 302b efficiently utilizes storage space. Once this initial copy is made, the replication module 316b may asynchronously mirror any updates (e.g., writes) made to the primary thin-provisioned volume 302a to the secondary thin-provisioned volume 302b, as is customary with XRC and other asynchronous data replication technologies.

Figure 4A:
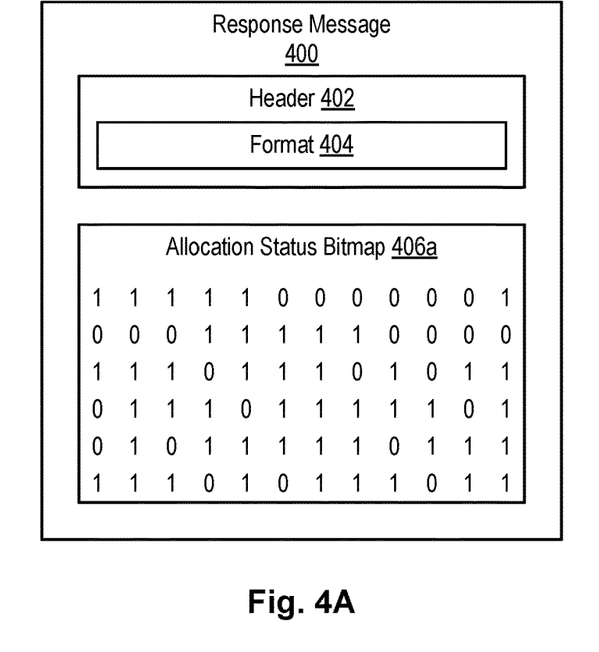
FIGS. 4A and 4B are high-level block diagrams showing two different embodiments of a response message.
Figure 4B:
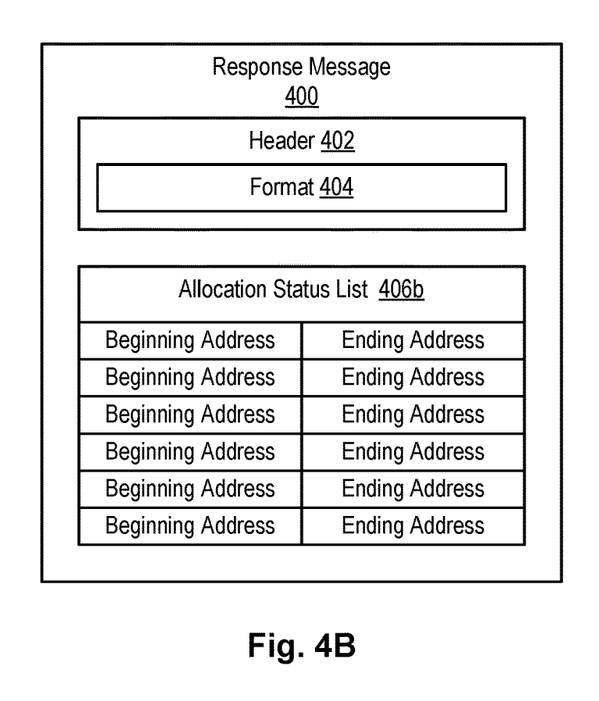

Referring to FIGS. 4A and 4B, as previously mentioned, the response message 400 may take on various forms to indicate which storage elements are backed by physical storage 204a. In general, the response message 400 may include any of several self-describing formats in which the format 404 of the information 406 is described by a header 402, followed by information 406 about the allocation status of storage elements within the thin-provisioned volume 302. Different storage systems 110 may return allocation information in different representations, where the representation is self-describing or follows a known pattern.

FIG. 4A shows one embodiment of a response message 400 containing an allocation status bitmap 406a. The allocation status bitmap 406a may include a bit for each storage element in the thin-provisioned volume 302. A storage element may include a track, group of tracks, cylinder (a cylinder may include a certain number of tracks), group of cylinders, extent, group of extents, or the like, depending on the granularity of storage space that is allocated or released from the thin-provisioned volume 302. The bit associated with the storage element may indicate whether the storage element is backed by physical storage 204. For example, a "1" may indicate that the storage element is backed by physical storage 204, while a "0" may indicate that the storage element is not backed by physical storage 204, or vice versa.

FIG. 4B shows another embodiment of a response message 400 containing an allocation status list 406b. The allocation status list 406b may include a list of storage areas that are backed by physical storage 204, where each storage area is identified by a tuple, namely a beginning address and ending address. Each storage area may include one or more storage elements, such as tracks, cylinders, extents, or the like. Alternatively, the allocation status list 406b may include a list of storage areas that are not backed by physical storage 204 (i.e., storage areas that are virtual only). Use of an allocation status list 406b may be more efficient in situations where there are large numbers of adjacent storage elements that are backed, or not backed, by physical storage 204.

Figure 5:
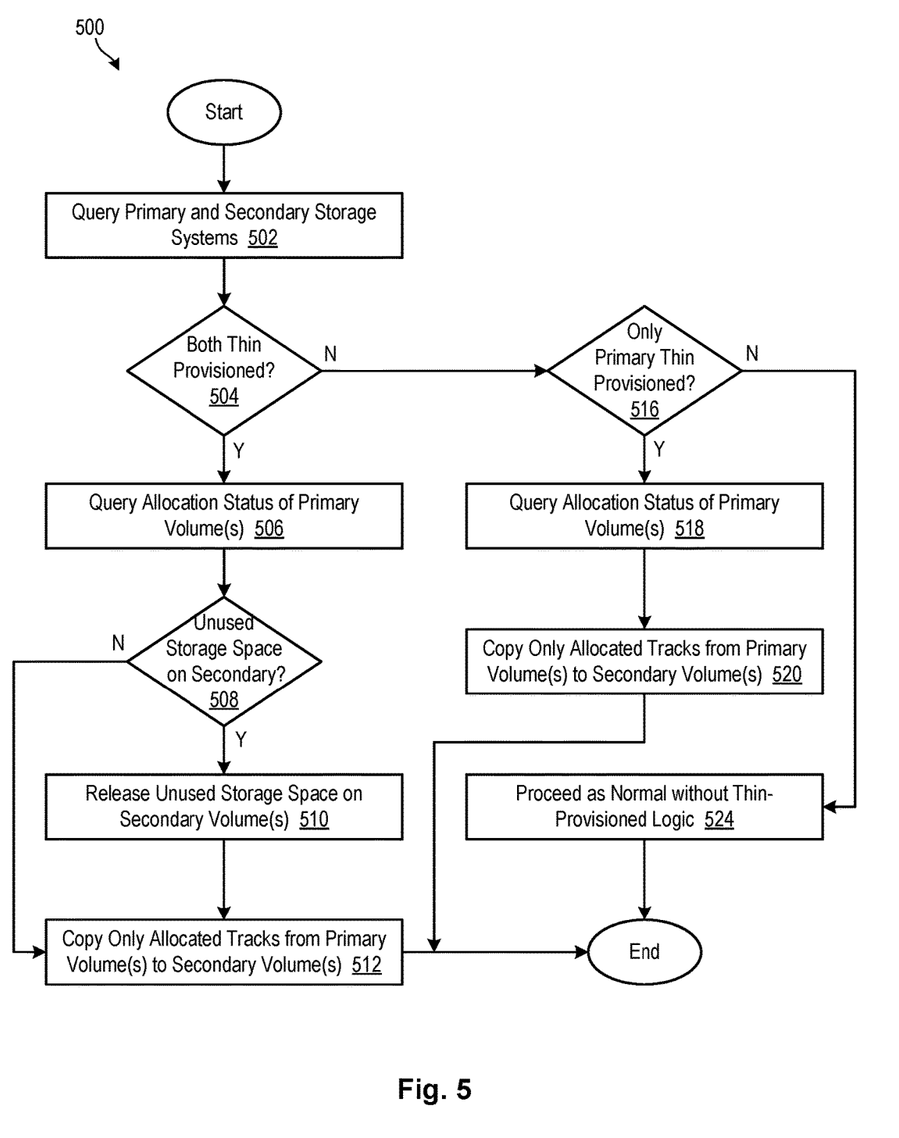
FIG. 5 is flow diagram showing one embodiment of a method for copying data between volumes in a data replication system.

Referring to FIG. 5, one embodiment of a method 500 for performing an initial copy, or subsequent copy, of a primary volume 302a to a secondary volume 302b is illustrated. Such a copy may be made, for example, when establishing an asynchronous mirroring relationship between a primary volume 302a and secondary volume 302b. As shown, the method 500 initially queries 502 the primary storage system 110a and secondary storage system 110b to determine whether the primary volume 302a and/or secondary volume 302b are thin-provisioned. In certain embodiments, this may be determined by examining a property or characteristic of the primary volume 302a and/or secondary volume 302b.

If, at step 504, both the primary volume 302a and secondary volume 302b are thin-provisioned, the method 500 queries 506 the allocation status of the primary volume 302a to determine which storage elements of the primary volume 302a are backed by physical storage 204. The method 500 also determines 508 whether the secondary volume 302b contains any unused storage space. If so, the method 500 releases 510 the unused storage space on the secondary volume 302b and returns this storage space to a free storage pool of the secondary storage system 110b. Using the allocation status information received in response to the query at step 506, the method 500 copies 512, from the primary volume 302a to the secondary volume 302b, only those storage elements on the primary volume 302a that are backed by physical storage 204a.

If, at step 516, only the primary volume 302a is thin-provisioned, the method 500 queries 518 the physical allocation status of the primary volume 302a and, using the information returned in response to the query, copies 520 only those storage elements that are backed by physical storage 204a. This will significantly reduce the number of I/Os to the primary volume 302a and secondary volume 302b.

If, at step 516, neither the primary volume 302a nor secondary volume 302b are thin-provisioned, or if only the secondary volume 302b is thin-provisioned, the method 500 proceeds 524 as normal without using the thin-provisioning logic set forth in steps 506, 508, 510, and 512. That is, the method 500 uses 524 conventional logic for fully provisioned volumes, which typically copies the entire physically-allocated storage space of the primary volume 302a to the secondary volume 302b.

Figure 6:
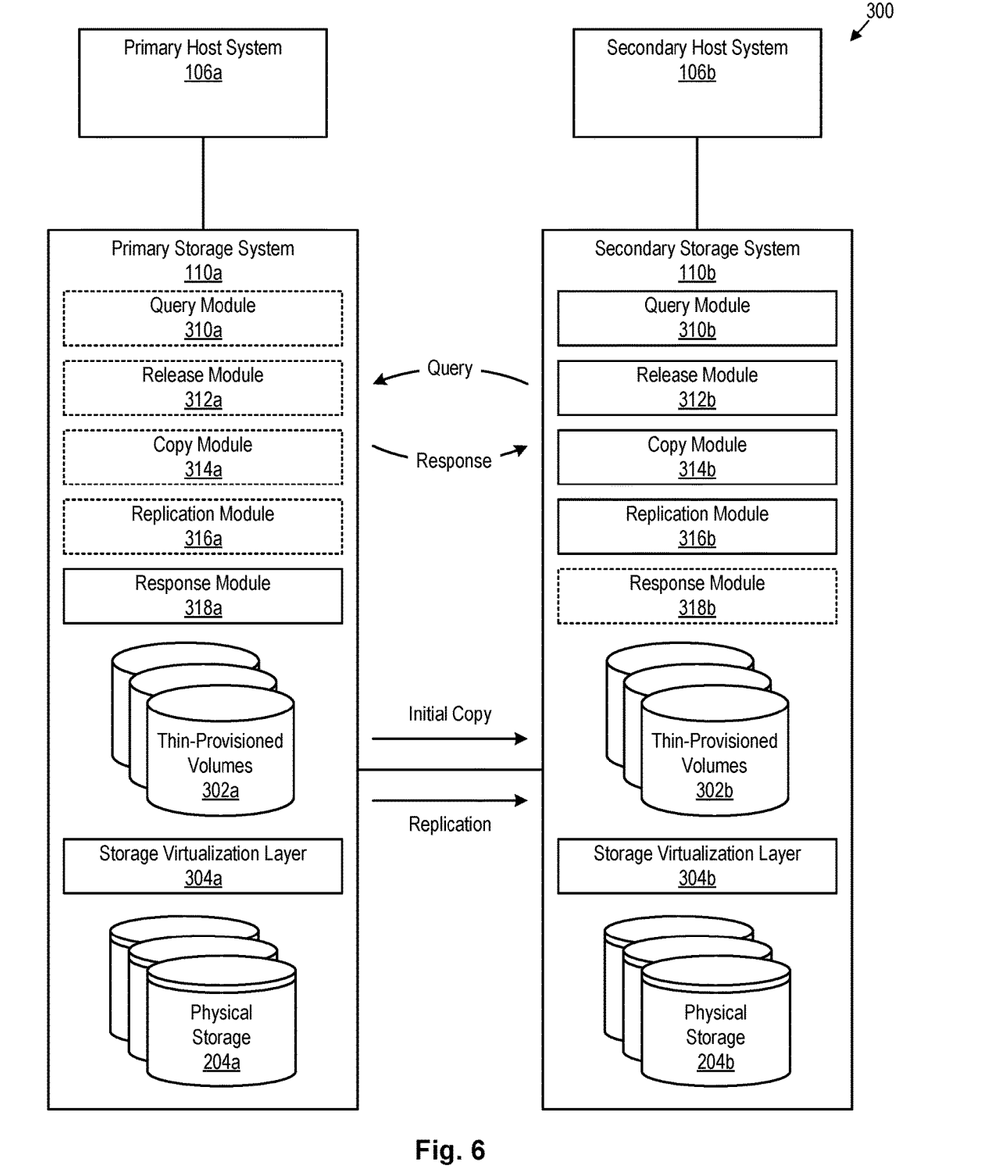
FIG. 6 is a high-level block diagram showing another example of a data replication system configured to use a system and method in accordance with the invention.

Referring to FIG. 6, the modules illustrated in FIG. 4 are not limited to the locations where they are illustrated. For example, many of the modules discussed in association with FIG. 4 may be contained or included within a storage system as opposed to a host system, depending on which device in configured to perform various functions. For example, as shown in FIG. 6, the secondary storage system 110b (as opposed to the secondary host system 106b) may, in certain embodiments, be configured to query the primary storage system 110a to determine which storage elements of a primary thin-provisioned volume 302a are backed by physical storage 204a. The primary storage system 110a may return this information to the secondary storage system 110b. The secondary storage system 110b may then copy, from the primary thin-provisioned volume 302a to the secondary thin-provisioned volume 302b, only those storage elements that are backed by physical storage 204a. Any updates to the primary thin-provisioned volume 302a may be replicated to the secondary thin-provisioned volume 302b by the secondary storage system 110b.

The systems and methods disclosed herein are not necessarily limited to use in data replication systems. Any application or system that could benefit from knowing the underlying configuration of a thin-provisioned volume may beneficially use the systems and methods described herein to query a thin-provisioned volume and gain knowledge of its underlying configuration. That is, various types of applications and systems may benefit from knowing which storage elements of a thin-provisioned volume are backed by physical storage. Thus, the systems and methods disclosed herein are not necessarily limited to use in data replication systems. Any application or system that queries a thin-provisioned volume for its underlying configuration is deemed to fall within the scope of the invention.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for copying data from a primary thin-provisioned volume to a secondary thin-provisioned volume, the method comprising:
    issuing a query to a primary storage system, the primary storage system hosting a thin-provisioned volume made up of a plurality of storage elements;
    returning, in response to the query, a reply indicating which storage elements in the thin-provisioned volume are backed by physical storage, wherein the reply contains at least one of an allocation status bitmap and an allocation status list that indicate which of the storage elements are backed by the physical storage; and
    copying, from the primary storage system to a secondary storage system, data in only those storage elements that are backed by the physical storage.

2. The method of claim 1, wherein the storage elements are one of tracks, groups of tracks, cylinders, groups of cylinders, extents, and groups of extents.

3. The method of claim 1, wherein the allocation status bitmap comprises a bit for each storage element in the thin-provisioned volume.

4. The method of claim 3, wherein each bit in the allocation status bitmap is set depending on whether the associated storage element is backed by physical storage.

5. The method of claim 1, wherein the allocation status list contains a list of tuples, each tuple comprising a starting address and ending address for a storage area that is backed by physical storage.

6. The method of claim 1, wherein the allocation status list contains a list of tuples, each tuple comprising a starting address and ending address for a storage area that is not backed by physical storage.

7. The method of claim 1, wherein issuing a query comprises issuing a query by a host system.

8. A computer program product to copy data from a primary thin-provisioned volume to a secondary thin-provisioned volume, the computer program product comprising a non-transitory computer-readable storage medium having computer-usable program code embodied therein, the computer-usable program code comprising:
    computer-usable program code to issue a query to a primary storage system, the primary storage system hosting a thin-provisioned volume made up of a plurality of storage elements;
    computer-usable program code to return, in response to the query, a reply indicating which storage elements in the thin-provisioned volume are backed by physical storage, wherein the reply contains at least one of an allocation status bitmap and an allocation status list that indicate which of the storage elements are backed by the physical storage; and computer-usable program code to copy, from the primary storage system to a secondary storage system, data in only those storage elements that are backed by the physical storage.

9. The computer program product of claim 8, wherein the storage elements are one of tracks, groups of tracks, cylinders, groups of cylinders, extents, and groups of extents.

10. The computer program product of claim 8, wherein the allocation status bitmap comprises a bit for each storage element in the thin-provisioned volume.

11. The computer program product of claim 10, wherein each bit in the allocation status bitmap is set depending on whether the associated storage element is backed by physical storage.

12. The computer program product of claim 8, wherein the allocation status list contains a list of tuples, each tuple comprising a starting address and ending address for a storage area that is backed by physical storage.

13. The computer program product of claim 8, wherein the allocation status list contains a list of tuples, each tuple comprising a starting address and ending address for a storage area that is not backed by physical storage.

14. The computer program product of claim 8, wherein issuing a query comprises issuing a query by a host system.

15. A system to copy data from a primary thin-provisioned volume to a secondary thin-provisioned volume, the system comprising:

at least one processor;

at least one memory device operably coupled to the at least one processor and storing instructions for execution on the at least one processor, the instructions causing the at least one processor to:

issue a query to a primary storage system, the primary storage system hosting a thin-provisioned volume made up of a plurality of storage elements;

return, in response to the query, a reply indicating which storage elements in the thin-provisioned volume are backed by physical storage, wherein the reply contains at least one of an allocation status bitmap and an allocation status list that indicate which of the storage elements are backed by the physical storage; and copy, from the primary storage system to a secondary storage system, data in only those storage elements that are backed by the physical storage.

16. The system of claim 15, wherein the storage elements are one of tracks, groups of tracks, cylinders, groups of cylinders, extents, and groups of extents.

17. The system of claim 15, wherein the allocation status bitmap comprises a bit for each storage element in the thin-provisioned volume.

18. The system of claim 17, wherein each bit in the allocation status bitmap is set depending on whether the associated storage element is backed by physical storage.

19. The system of claim 15, wherein the allocation status list contains a list of tuples, each tuple comprising a starting address and ending address for a storage area that is backed by physical storage.

20. The system of claim 15, wherein the allocation status list contains a list of tuples, each tuple comprising a starting address and ending address for a storage area that is not backed by physical storage.

* * * * *